(12) United States Patent　　　　(10) Patent No.:　US 12,608,817 B2
He et al.　　　　　　　　　　　　　　(45) Date of Patent:　Apr. 21, 2026

(54) MULTI-VIEW COLLABORATIVE TRACKING METHOD AND APPARATUS FOR FAST MOVING TARGET UNDER LOW LUMINANCE CONDITION

(71) Applicant: Tongji University, Shanghai (CN)

(72) Inventors: Bin He, Shanghai (CN); Gang Li, Shanghai (CN); Xiangxin Ji, Shanghai (CN); Bin Cheng, Shanghai (CN); Yanmin Zhou, Shanghai (CN); Zhipeng Wang, Shanghai (CN); Shuo Jiang, Shanghai (CN); Zhongpan Zhu, Shanghai (CN); Pengpeng Zhang, Shanghai (CN); Xin Li, Shanghai (CN); Han Zhu, Shanghai (CN)

(73) Assignee: Tongji University, Shanghai (CN)

( * ) Notice: Subject to any disclaimer, the term of this patent is extended or adjusted under 35 U.S.C. 154(b) by 321 days.

(21) Appl. No.: 18/416,961

(22) Filed: Jan. 19, 2024

(65) Prior Publication Data

US 2024/0249418 A1　　Jul. 25, 2024

(30) Foreign Application Priority Data

Jan. 20, 2023　(CN) .......................... 202310056537.9

(51) Int. Cl.
　　*G06T 7/70*　　　　(2017.01)
　　*G06T 5/70*　　　　(2024.01)
　　(Continued)

(52) U.S. Cl.
　　CPC .................. *G06T 7/20* (2013.01); *G06T 5/70* (2024.01); *G06T 7/70* (2017.01); *G06V 10/44* (2022.01);
　　(Continued)

(58) Field of Classification Search
　　CPC .... G06T 7/20; G06T 7/70; G06T 5/70; G06T 2207/30241; G06V 10/44; G06V 10/60;
　　(Continued)

(56) References Cited

FOREIGN PATENT DOCUMENTS

CN　　　114679729 A　*　6/2022　............ H04W 16/22

OTHER PUBLICATIONS

Gu et al, Multiple Moving Targets Surveillance Based on a Cooperative Network for Multi-UAV, 2018, IEEE Communications Magazine 56(4): 82-89. (Year: 2018).*

(Continued)

*Primary Examiner* — Kathleen M Broughton

(74) *Attorney, Agent, or Firm* — Viering, Jentschura & Partner MbB

(57)　　　　ABSTRACT

The present disclosure provides a multi-view collaborative tracking method and apparatus for a fast moving target under a low luminance condition, including a multi-view target tracking algorithm based on radar-vision fusion data and an unmanned aerial vehicle (UAV) cluster collaborative tracking technology. This method takes the spatiotemporal normalized multi-source data as the learning objective of multi-agent reinforcement learning, to drive the cluster to collect data from multiple angles and directions. In this way, highly-efficient multi-angle collaborative observation can be performed on a high-speed moving object in an environment of weak texture and low luminance.

20 Claims, 6 Drawing Sheets

(51) Int. Cl.

| | |
|---|---|
| *G06T 7/20* | (2017.01) |
| *G06V 10/44* | (2022.01) |
| *G06V 10/60* | (2022.01) |
| *G06V 10/771* | (2022.01) |
| *H04N 13/351* | (2018.01) |

(52) U.S. Cl.
 CPC ............ *G06V 10/60* (2022.01); *G06V 10/771*
 (2022.01); *H04N 13/351* (2018.05); *G06T*
 *2207/30241* (2013.01)

(58) Field of Classification Search
 CPC .... G06V 10/771; G06V 20/13; H04N 13/351;
 G01S 7/003; G01S 13/726; G01S 13/867;
 G01S 13/87; G01S 13/86; Y02T 10/40;
 G01C 21/005; G01C 21/20
 See application file for complete search history.

(56) References Cited

OTHER PUBLICATIONS

Farmani et al, A Scalable Multitarget Tracking System for Cooperative Unmanned Aerial Vehicles, 2017, IEEE Transactions on Aerospace and Electronic Systems, 53(4): 1947-1961. (Year: 2017).*
Lv et al, Multi-Objective Association Detection of Farmland Obstacles Based on Information Fusion of Millimeter Wave Radar and Camera, 2022, Sensors 23(230): pp. 1-18. (Year: 2022).*
Cui et al, Multi-Agent Reinforcement Learning-Based Resource Allocation for UAV Networks, 2020, IEEE Transactions on Wireless Communications, 19(2): 729-743. (Year: 2020).*

\* cited by examiner

MULTI-VIEW COLLABORATIVE TRACKING METHOD AND APPARATUS FOR FAST MOVING TARGET UNDER LOW LUMINANCE CONDITION

CROSS REFERENCE TO RELATED APPLICATION

This patent application claims the benefit and priority of Chinese Patent Application No. 202310056537.9, filed with the China National Intellectual Property Administration on Jan. 20, 2023, the disclosure of which is incorporated by reference herein in its entirety as part of the present application.

TECHNICAL FIELD

The present disclosure relates to the field of unmanned aerial vehicle (UAV) target tracking technologies, and in particular to a multi-view collaborative tracking method and apparatus for a fast moving target under a low luminance condition.

BACKGROUND

In recent years, unmanned aerial vehicle (UAVs) have been rapidly developed and is combined with artificial intelligence technologies such as deep learning and reinforcement learning, so that a plurality of tasks can be completed by using UAVs. In addition, UAVs are widely used in civilian, military, and other fields such as localization and mapping and path planning in a position scenario because of features such as small, flexible, and independent intelligence. In various application fields of UAVs, target tracking is a core of most tasks. The target tracking task of UAVs is limited by complexity of scenarios and the variability of tracked targets, making it difficult to extract a feature of a target and establish a model, which poses a huge challenge to tracking performance.

In a conventional target tracking technology, visual data is mostly used as a data source of target tracking. However, in a low luminance scenario, most of such data has defects such as fuzzy visual information and insufficient information contained in a feature of a target, which seriously affects final tracking performance. In addition, the target tracking method based on UAVs mostly uses a single UAV to track a related target, and the target is easily lost in a complex environment such as an underground cavern due to blocking of obstacle and abruptly changed terrain.

SUMMARY

For the foregoing problems, an objective of the present disclosure is to provide a multi-view collaborative tracking method and apparatus for a fast moving target under a low luminance condition. In a low luminance scenario, a UAV cluster is deployed, and each UAV is equipped with a corresponding multi-source fusion sensor as a multi-view fusion data source. After any agent in the UAV cluster completes target positioning, collaborative tracking is implemented by using a multi-agent reinforcement learning algorithm, to implement multi-view collaborative tracking of a fast moving target under a low luminance condition.

To resolve the foregoing technical problems, embodiments of the present disclosure provide the following solutions.

According to an aspect, a multi-view collaborative tracking method for a fast moving target under a low luminance condition is provided, where the method includes a multi-view tracking algorithm for a fast moving target under a low luminance condition and a UAV cluster collaborative tracking algorithm;

the multi-view tracking algorithm for a fast moving target under a low luminance condition includes the following steps:

performing multi-source environment sensing by using sensors that include a millimeter wave radar sensor, a red green blue (RGB) visual sensor, and an infrared visual sensor and are carried by a UAV;

normalizing, in a time dimension and a space dimension by using a three-space-time heterogeneous alignment algorithm, multi-source sensing data received by different sensors;

inputting multi-source fused sensing data obtained through space-time normalization into a multi-source fusion sensing feature calculation network and calculating world coordinates of a tracked target under a current frame; and comparing a calculation result with a calculation result of a previous frame, and determining changes of a position and a moving direction of the tracked target in a world coordinate system; and the UAV cluster collaborative tracking algorithm includes the following steps:

sharing world coordinate information of the tracked target through cluster communication, and formulating and updating a trajectory of a UAV cluster through multi-agent reinforcement learning, to ensure that the tracked target is at a center of a sensing range of the UAV, and implement collaborative tracking of the UAV cluster.

Preferably, the three-space-time heterogeneous alignment algorithm specifically includes:

first preprocessing the multi-source sensing data acquired by the sensors; for sensing data of the millimeter wave radar sensor, removing invalid data including a static target and an empty target; and for sensing data of the RGB visual sensor and the infrared visual sensor, performing image denoising, to highlight a feature of the target;

then performing space-time alignment on denoised sensing data of the RGB visual sensor and the infrared visual sensor, where because view directions of the RGB visual sensor and the infrared visual sensor are relatively fixed on a same UAV, alignment is performed by using a scale invariant feature transform (SIFT) operator in a machine learning method; and finally, calibrating the sensing data of the millimeter wave radar sensor based on the sensing data of the RGB visual sensor; for time heterogeneity, performing radar-visual time calibration based on a sampling frequency of the sensing data of the millimeter wave radar sensor, and for space heterogeneity, establishing a unified coordinate system according to actual deployment positions of two sensors, and establishing a conversion relationship between a respective coordinate system and the world coordinate system; and finally completing space-time heterogeneous alignment on the three pieces of sensing data.

Preferably, after data preprocessing is completed, scale normalization is performed on the multi-source sensing data by using the three-space-time heterogeneous alignment algorithm; and the sensing data of the infrared visual sensor and the millimeter wave radar sensor is respectively aligned based on a space scale and a time latitude of the sensing data of the RGB visual sensor;

for alignment of the sensing data of the infrared visual sensor and the RGB visual sensor, because the infrared visual sensor and the RGB visual sensor are fixed relative to a body of the UAV, and variations of views are relatively small, calibration is performed by using the SIFT operator, a space parameter of the sensing data of the RGB visual sensor is fixed, the sensing data of the infrared visual sensor in the same time latitude is inputted, and pixel-aligned sensing data of the infrared visual sensor is outputted; and in the time latitude, the two pieces of sensing data are aligned by using the same sampling frequency; and for alignment of the sensing data of the millimeter wave radar sensor and the RGB visual sensor, for time calibration of the two pieces of sensing data, the sampling frequency of the millimeter wave radar sensor is used as a time reference, a pulse frequency is sent for each sampling, and after receiving the pulse frequency, a central control determines a quantity of frames in sampling of the millimeter wave radar sensor as a sampling result, to implement time calibration; and for space calibration of the two pieces of sensing data, the coordinate system needs to be unified, a radar video is defined as resolving a feature matrix $[x, y, 1]^T$, radar physical coordinates of four pairs of targets are acquired and calibrated with video coordinates, and then a conversion relationship between a radar coordinate system and the world coordinate system is established, where a calculation formula of the conversion relationship is as follows:

$$x' = \left(\frac{x}{\Delta x}\right)\cos\theta + \left(\frac{y}{\Delta y}\right)\sin\theta + \alpha, \, y' = \left(\frac{y}{\Delta y}\right)\cos\theta + \left(\frac{x}{\Delta x}\right)\sin\theta + \beta$$

where (x, y) is radar detected target coordinates, (x', y') is converted world coordinates, $\Delta$ is a scaling relationship between related coordinate axes, $\alpha$ and $\beta$ represent translation amounts of corresponding coordinate axes, and $\theta$ represents a rotation angle of a coordinate system.

Preferably, the multi-source fusion sensing feature calculation network is a convolutional neural network and includes a feature extraction module, a feature fusion module, and a target position prediction module of each sensor; and the feature extraction module is configured to perform target feature extraction on the sensing data of each sensor, and send an extracted feature to the feature fusion module to obtain a multi-source fused sensing feature, and finally the target position prediction module is configured to calculate a position of the target in the current frame, and perform world coordinate system conversion according to a relative position of a sensor that is of the UAV and shoots the target, to obtain a position of the target in the current world coordinate system.

Preferably, in the feature extraction module, a feature extraction network is built for the sensing data of the three sensors, feature extraction is performed on the sensing data of the RGB visual sensor and the sensing data of the infrared visual sensor by using a lightweight cross stage partial (CSP) Darknet 53 network, feature extraction is performed on the sensing data of the millimeter wave radar sensor by using a lightweight visual geometry group (VGG)-13 network, and the input sensing data of the millimeter wave radar sensor is converted into a radar feature that has a same size as the sensing data of the RGB visual sensor;

in the feature fusion module, features of the sensing data of the three sensors are further processed and spliced into a composite vector, where a calculation formula is:

$$F_{fusion} = \sigma(f_{radar} + f_{RGB} + f_{IR})$$
$$f_* = W_2 \cdot \tau(W_1 \cdot \tau(W_0(AvgPool(F_*))))$$

where $\sigma$ and $\tau$ in the formula represent a Sigmoid activation function and a ReLU activation function, $W_0$, $W_1$, and $W_2$ are network weight parameters, $F_*$ is a feature map, $f_{radar}$ is an extracted radar feature, $f_{RGB}$ is an extracted RGB visual feature, $f_{IR}$ is an extracted infrared visual feature, $F_{fusion}$ is a fused feature, and $f_*$ is a spliced feature map; and the spliced feature map is sent to the target position prediction module and the position of the target is determined; and then the position of the current target in the world coordinate system is calculated according to a conversion relationship between a coordinate system of the RGB visual sensor and the world coordinate system.

Preferably, the UAV cluster collaborative tracking algorithm specifically includes:

after completing target positioning, sharing, by any UAV in the UAV cluster, the world coordinates of the target and position information of the UAV by using a cluster communication function of the UAV; and then enabling another UAV in the UAV cluster to be close to the coordinates of the tracked target by using a multi-agent reinforcement learning method, to implement collaborative tracking of the UAV cluster.

Preferably, the enabling another UAV in the UAV cluster to be close to the coordinates of the tracked target by using a multi-agent reinforcement learning method specifically includes:

enabling another UAV that does not perform target positioning in the UAV cluster to be close to the position of the target by using the multi-agent reinforcement learning method, and maintaining, by the UAV that completes target positioning, the target at a center of a sensing range of the UAV, to finally implement collaborative tracking of the UAV cluster.

According to another aspect, a multi-view collaborative tracking apparatus for a fast moving target under a low luminance condition is provided, including a multi-view tracking algorithm module for a fast moving target under a low luminance condition module and a UAV cluster collaborative tracking algorithm module;

the multi-view tracking algorithm module for a fast moving target under a low luminance condition is configured to:

perform multi-source environment sensing by using sensors that include a millimeter wave radar sensor, a red green blue (RGB) visual sensor, and an infrared visual sensor and are carried by a UAV;

normalize, in a time dimension and a space dimension by using a three-space-time heterogeneous alignment algorithm, multi-source sensing data received by different sensors;

input multi-source fused sensing data obtained through space-time normalization into a multi-source fusion sensing feature calculation network and calculate world coordinates of a tracked target under a current frame; and compare a calculation result with a calculation result of a previous frame, and determine changes of a position and a moving direction of the tracked target in a world coordinate system; and the UAV cluster collaborative tracking algorithm module is configured to:

share world coordinate information of the tracked target through cluster communication, and formulate and update a trajectory of a UAV cluster through multi-agent reinforcement learning, to ensure that the tracked target is at a center of a sensing range of the UAV, and implement collaborative tracking of the UAV cluster.

According to another aspect, an electronic device is provided, including a processor and a memory, where the memory stores at least one instruction, and the at least one instruction is loaded and executed by the processor to implement the multi-view collaborative tracking method for a fast moving target under a low luminance condition.

According to another aspect, a computer-readable storage medium is provided, storing at least one instruction, where the at least one instruction is loaded and executed by a processor to implement the multi-view collaborative tracking method for a fast moving target under a low luminance condition.

Technical solutions provided in the embodiments of the present disclosure achieve at least the following beneficial effects:

The embodiments of the present disclosure provide a multi-view collaborative tracking method for a fast moving target under a low luminance condition. In a low luminance scenario, feature extraction is performed on multi-source fused sensing data of a UAV cluster, a position of a target in a world coordinate system is determined, and coordinate information is shared through cluster communication, to collaboratively track a fast moving target.

According to the multi-view collaborative tracking method for a fast moving target under a low luminance condition, fusion feature extraction is performed on data outputted by a millimeter wave radar sensor, an RGB visual sensor, and an infrared visual sensor, after feature extraction is completed, the position of the target in the world coordinate system is determined by using a multi-source fusion sensing feature calculation network, then a UAV target tracking result is shared through cluster communication, and a trajectory is formulated and updated by using a multi-agent reinforcement learning algorithm, thereby improving target feature information extraction quality, reducing sensing and communication losses, and improving a target tracking effect in the low luminance scenario.

According to the multi-view collaborative tracking method for a fast moving target under a low luminance condition provided in the present disclosure, multi-angle collaborative observation can be performed on a high-speed moving object in an environment of weak texture and low luminance, thereby improving tracking quality and efficiency of the UAV cluster.

BRIEF DESCRIPTION OF THE DRAWINGS

In order to describe the technical solutions in the examples of the present disclosure more clearly, the accompanying drawings required to describe the examples are briefly described below. Apparently, the accompanying drawings described below are only some examples of the present disclosure. Those of ordinary skill in the art may further obtain other accompanying drawings based on these accompanying drawings without inventive effort.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Figure 1:
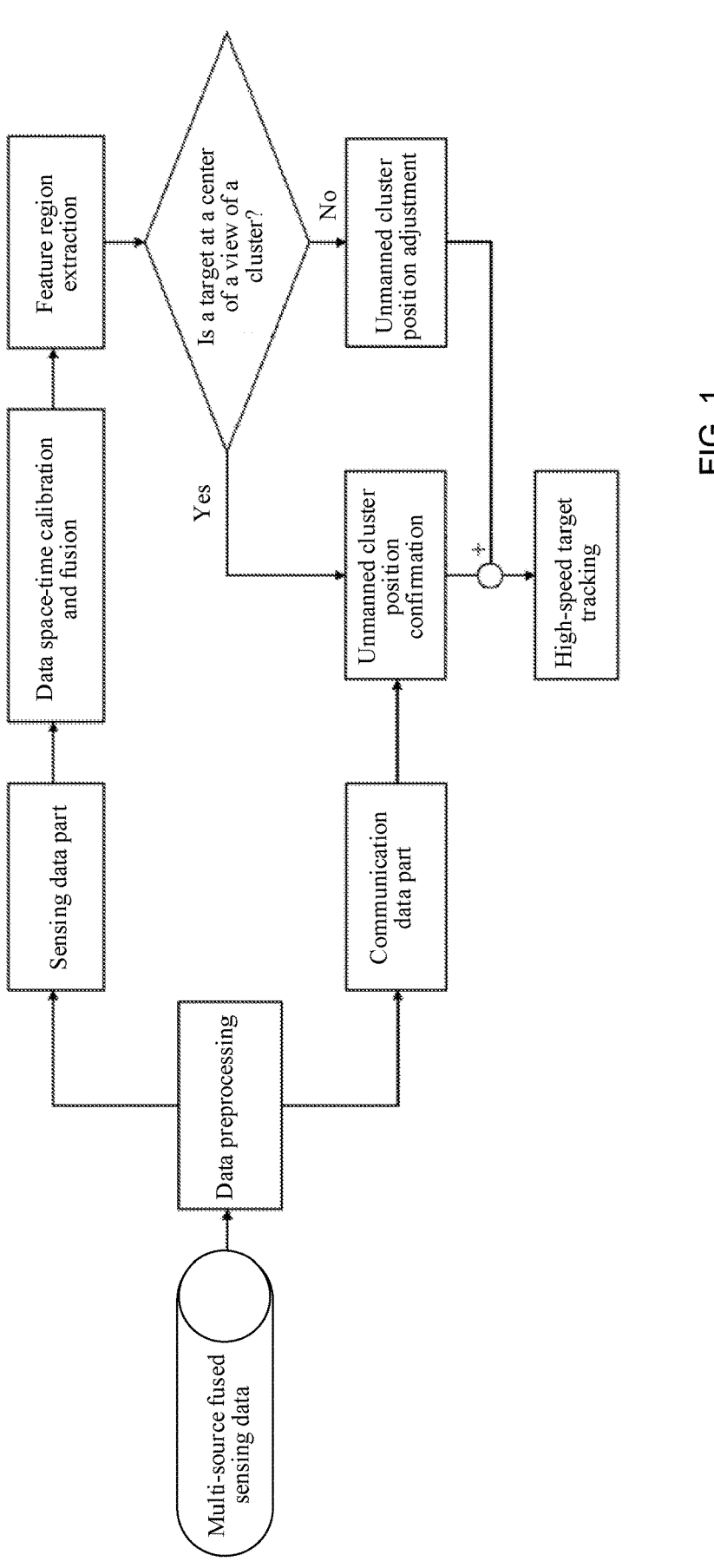
FIG. 1 is a schematic flowchart of a multi-view collaborative tracking method for a fast moving target under a low luminance condition according to an embodiment of the present disclosure.

An embodiment of the present disclosure provides a multi-view collaborative tracking method for a fast moving target under a low luminance condition, which is applicable to a scenario such as a weak light condition (for example, an underground cavern). Referring to FIG. 1, the method includes a multi-view tracking algorithm for a fast moving target under a low luminance condition and a UAV cluster collaborative tracking algorithm.

The multi-view tracking algorithm for a fast moving target under a low luminance condition includes the following steps:

performing multi-source environment sensing by using sensors that include a millimeter wave radar sensor, a red green blue (RGB) visual sensor, and an infrared visual sensor and are carried by a UAV; normalizing, in a time dimension and a space dimension by using a three-space-time heterogeneous alignment algorithm, multi-source sensing data received by different sensors; inputting multi-source fused sensing data obtained through space-time normalization into a multi-source fusion sensing feature calculation network and calculating world coordinates of a tracked target under a current frame; and comparing a calculation result with a calculation result of a previous frame, and determining changes of a position and a moving direction of the tracked target in a world coordinate system.

The UAV cluster collaborative tracking algorithm includes the following steps:

sharing world coordinate information of the tracked target through cluster communication, and formulating and updating a trajectory of a UAV cluster through multi-agent reinforcement learning, to ensure that the tracked target is at a center of a sensing range of the UAV, and implement collaborative tracking of the UAV cluster.

In this embodiment of the present disclosure, a high-speed moving target is tracked by using the UAV cluster within a defined ranged under a low luminance condition, two types of sensor data of the millimeter wave radar sensor and vehicle-mounted cameras (the RGB visual sensor and the infrared visual sensor) are combined by using a radar-visual fusion algorithm, a fused feature parameter is extracted, the feature parameter is compared with a feature parameter of a previous frame, and changes of a position and a moving direction of the tracked target are determined; and then sensing information is fused into communication information and is transmitted in the UAV cluster, so that a data transmission loss is reduced, and a positioning and deployment capability of the cluster is also improved.

Figure 2A:
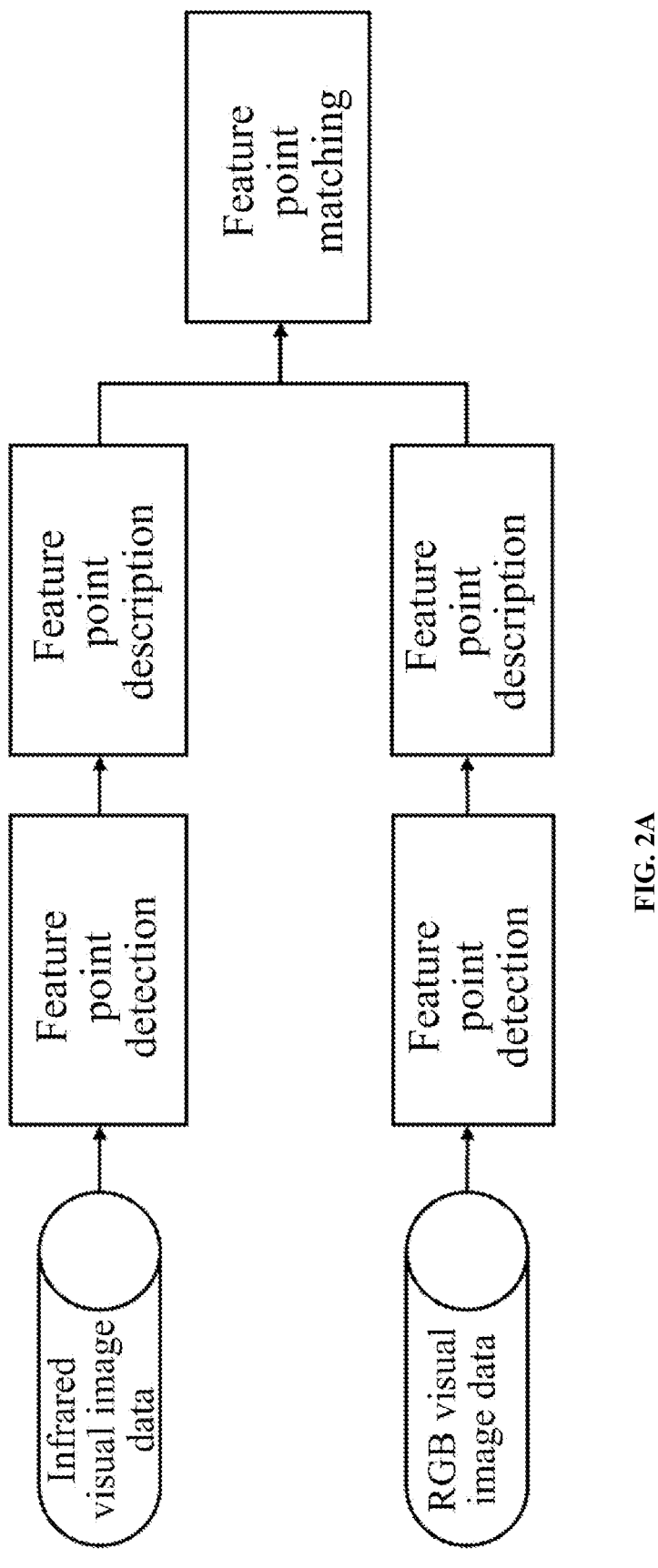
FIGS. 2A-B are schematic diagrams of a three-space-time heterogeneous alignment algorithm according to an embodiment of the present disclosure.
Figure 2B:
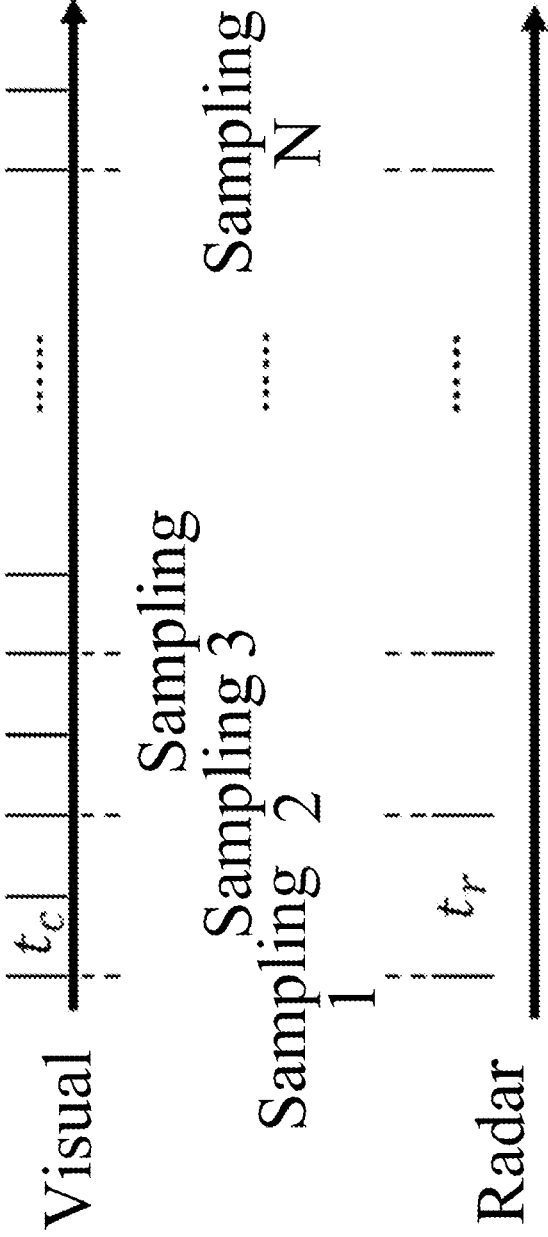

Further, as shown in FIGS. 2A-B, the three-space-time heterogeneous alignment algorithm specifically includes:

first preprocessing the multi-source sensing data acquired by the sensors; for sensing data of the millimeter wave radar sensor, removing invalid data including a static target and an empty target; and for sensing data of the RGB visual sensor and the infrared visual sensor, performing image denoising, to highlight a feature of the target;

then performing space-time alignment on denoised sensing data of the RGB visual sensor and the infrared visual sensor, where because view directions of the RGB visual sensor and the infrared visual sensor are relatively fixed on a same UAV, alignment is performed by using a scale invariant feature transform (SIFT) operator in a machine learning; and finally, calibrating the sensing data of the millimeter wave radar sensor based on the sensing data of the RGB visual sensor; for time heterogeneity, performing radar-visual time calibration based on a sampling frequency of the sensing data of the millimeter wave radar sensor, and for space heterogeneity, establishing a unified coordinate system according to actual deployment positions of two sensors, and establishing a conversion relationship between a respective coordinate system and the world coordinate system; and finally completing space-time heterogeneous alignment on the three pieces of sensing data.

Specifically, after data preprocessing is completed, scale normalization is performed on the multi-source sensing data by using the three-space-time heterogeneous alignment algorithm; and the sensing data of the infrared visual sensor and the millimeter wave radar sensor is respectively aligned based on a space scale and a time latitude of the sensing data of the RGB visual sensor. FIG. 2A is a schematic diagram of an alignment process of infrared visual sensing data and RGB visual sensing data, and FIG. 2B is a schematic diagram of an alignment process of visual sensing data and millimeter wave radar sensing data.

For alignment of sensing data of the infrared visual sensor and the RGB visual sensor, because the infrared visual sensor and the RGB visual sensor are fixed relative to a body of the UAV, and variations of views are small, calibration is performed by using the SIFT algorithm, a space parameter of the sensing data of the RGB visual sensor is fixed, the sensing data of the infrared visual sensor in the same time latitude is inputted, and pixel-aligned sensing data of the infrared visual sensor is outputted. A specific method includes: fixing the space parameter of the sensing data of the RGB visual sensor, inputting the sensing data of the infrared visual sensor in the same time latitude, selecting different Gaussian kernels, generating image clusters, performing subtraction the image clusters and then performing downsampling, and calculating a multi-scale Gaussian difference map; comparing a pixel in the Gaussian difference map with a surrounding pixel, obtaining a maximum value for substitution, to obtain a key point, overlaying all gradient directions in a circle by using the key point as a center of the circle to eight directions, and selecting a maximum value again as a main direction of the key point; on this basis, describing a feature of the key point by using a 128-dimensional vector, and performing feature matching by using an Euclidean distance between the vectors; and finally outputting feature-matched infrared visual sensing data. In the time latitude, the two pieces of sensing data are aligned by using the same sampling frequency.

For alignment of the sensing data of the millimeter wave radar sensor and the RGB visual sensor, for time calibration of the two pieces of sensing data, the sampling frequency of the millimeter wave radar sensor is used as a time reference, a pulse frequency is sent for each sampling, and after receiving the pulse frequency, a central control determines a quantity of frames in sampling of the millimeter wave radar sensor as a sampling result, to implement time calibration; and for space calibration of the two pieces of sensing data, the coordinate system needs to be unified, a radar video is defined as resolving a feature matrix [x, y, 1]T, radar physical coordinates of four pairs of targets are acquired and calibrated with video coordinates, and then a conversion relationship between a radar coordinate system and the world coordinate system is established, where a calculation formula of the conversion relationship is as follows:

$$x' = \left(\frac{x}{\Delta x}\right)\cos\theta + \left(\frac{y}{\Delta y}\right)\sin\theta + \alpha, \ y' = \left(\frac{y}{\Delta y}\right)\cos\theta + \left(\frac{x}{\Delta x}\right)\sin\theta + \beta$$

where (x,y) is radar detected target coordinates, (x', y') is converted world coordinates, $\Delta$ is a scaling relationship between related coordinate axes, $\alpha$ and $\beta$ represent translation amounts of corresponding coordinate axes, and $\theta$ represents a rotation angle of a coordinate system.

Further, the multi-source fusion sensing feature calculation network is a convolutional neural network and includes a feature extraction module, a feature fusion module, and a target position prediction module of each sensor.

The feature extraction module is configured to perform target feature extraction on the sensing data of each sensor, and send an extracted feature to the feature fusion module to obtain a multi-source fused sensing feature, and finally the target position prediction module is configured to calculate a position of the target in the current frame, and perform world coordinate system conversion according to a relative position of a sensor that is of the UAV and shoots the target, to obtain a position of the target in the current world coordinate system.

Figure 3:
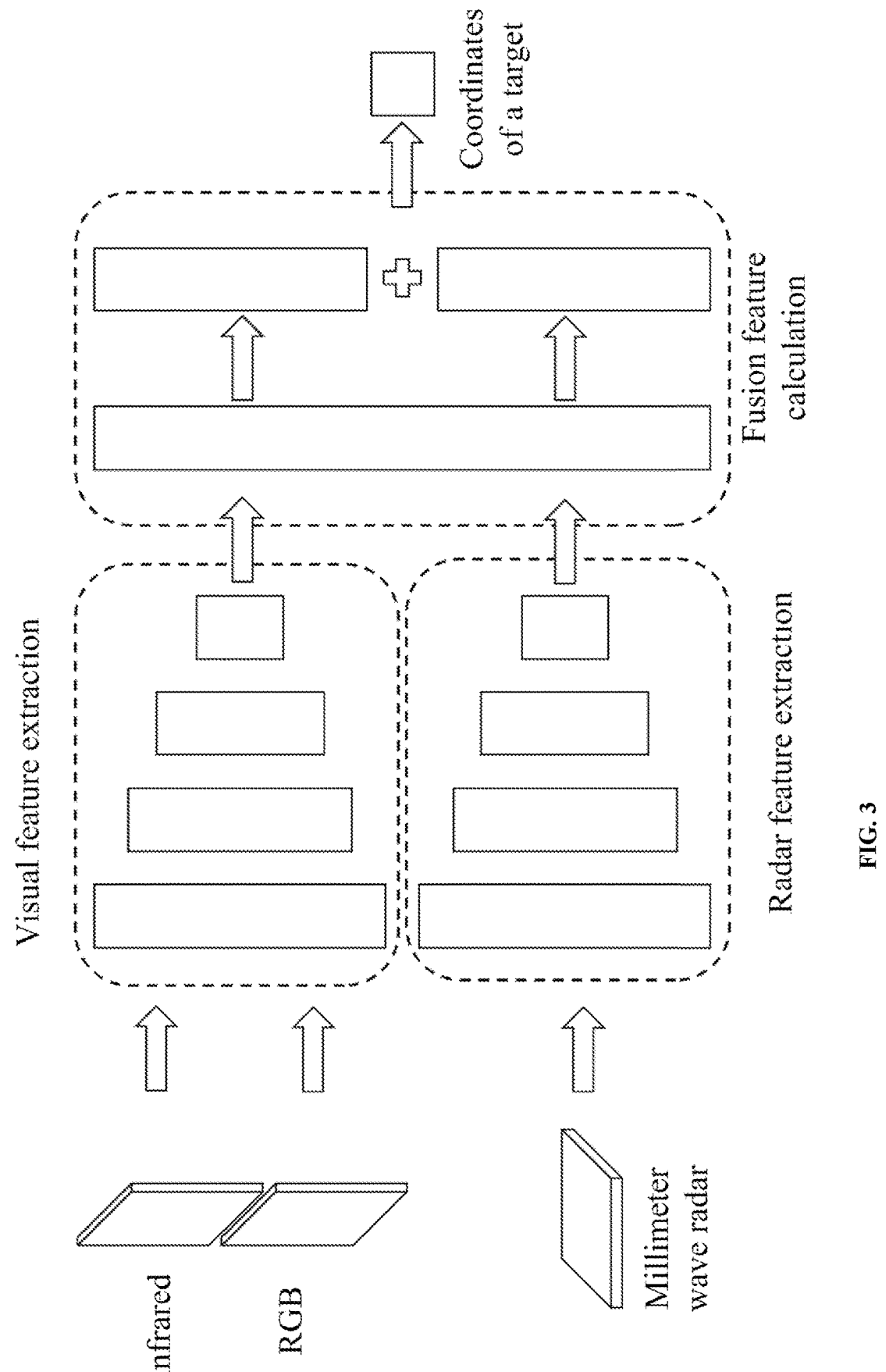
FIG. 3 is a schematic diagram of a multi-source fusion sensing feature calculation network according to an embodiment of the present disclosure.

FIG. 3 is a schematic diagram of the multi-source fusion sensing feature calculation network. After a space-time alignment operation is completed, the three pieces of sensing data are sent to the multi-source fusion sensing feature calculation network.

In the feature extraction module, a feature extraction network is built for the sensing data of the three sensors, feature extraction is performed on the sensing data of the RGB visual sensor and the sensing data of the infrared visual sensor by using a lightweight cross stage partial (CSP) Darknet 53 network, feature extraction is performed on the sensing data of the millimeter wave radar sensor by using a lightweight visual geometry group (VGG)-13 network, and the input sensing data of the millimeter wave radar sensor is converted into a radar feature that has a same size as the sensing data of the RGB visual sensor.

In the feature fusion module, features of the sensing data of the three sensors are further processed and spliced into a composite vector, where a calculation formula is:

$$F_{fusion} = \sigma(f_{radar} + f_{RGB} + f_{IR})$$
$$f_* = W_2 \cdot \tau(W_1 \cdot \tau(W_0(AvgPool(F_*))))$$

where $\sigma$ and $\tau$ in the formula represent a Sigmoid activation function and a ReLU activation function, $W_0$, $W_1$, and $W_2$ are network weight parameters, $F_*$ is a feature map, $f_{radar}$ is an extracted radar feature, $f_{RGB}$ is an extracted RGB visual feature, $f_{IR}$ is an extracted infrared visual feature, $F_{fusion}$ is a fused feature, and $f_*$ is a spliced feature map.

The spliced feature map is sent to the target position prediction module and the position of the target is determined; and then the position of the current target in the world coordinate system is calculated according to a conversion relationship between a coordinate system of the RGB visual sensor and the world coordinate system.

Figure 4A:
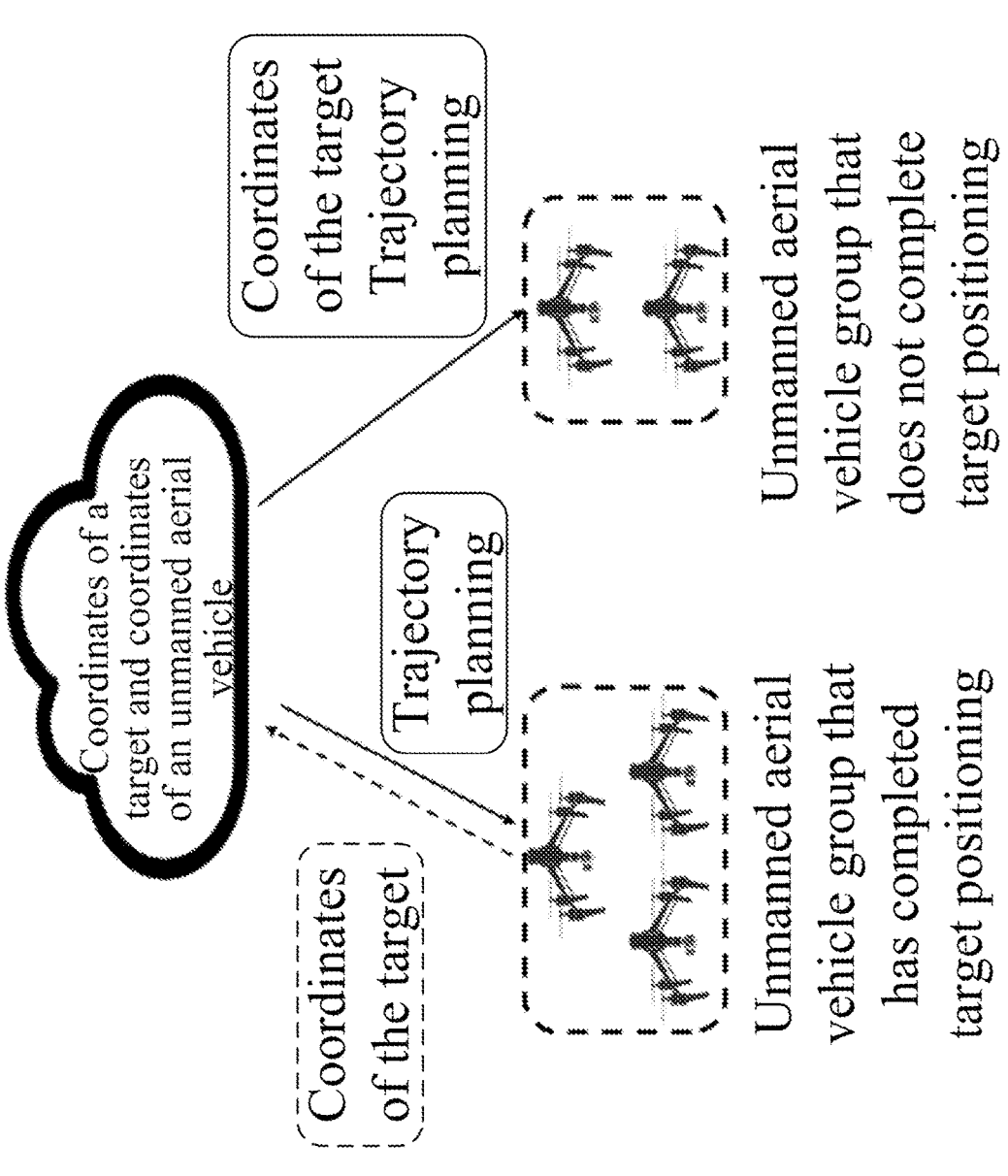
FIGS. 4A-B are schematic diagrams of a UAV cluster collaborative tracking algorithm according to an embodiment of the present disclosure.
Figure 4B:
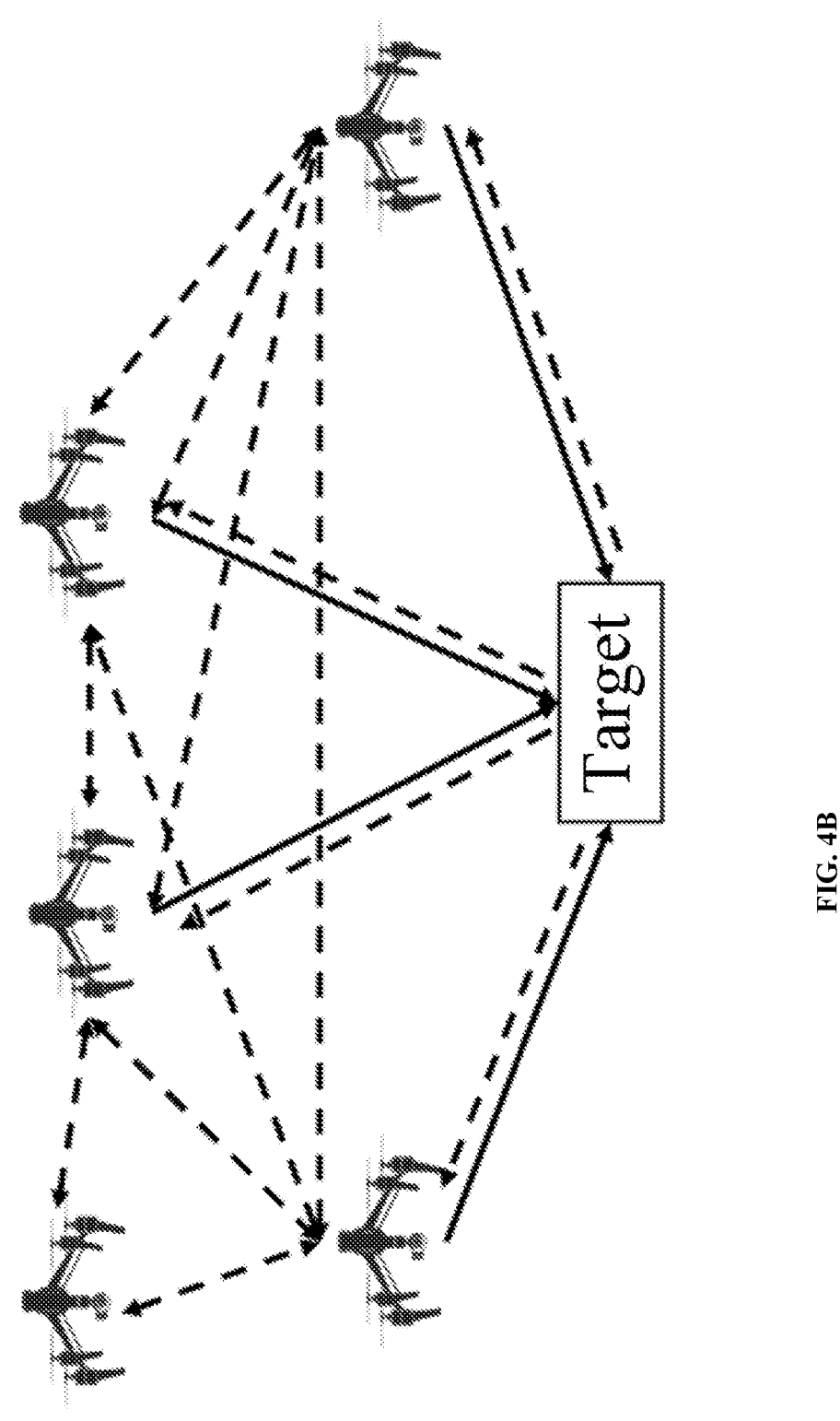

Further, FIG. 4A-B are schematic diagrams of a UAV cluster collaborative tracking algorithm according to an embodiment of the present disclosure. The UAV cluster collaborative tracking algorithm specifically includes:

after completing target positioning, sharing, by any UAV in the UAV cluster, the world coordinates of the target and position information of the UAV by using a cluster communication function of the UAV; and then enabling another UAV in the UAV cluster to be close to the coordinates of the tracked target by using a multi-agent reinforcement learning method, to implement collaborative tracking of the UAV cluster.

The enabling another UAV in the UAV cluster to be close to the coordinates of the tracked target by using a multi-agent reinforcement learning method specifically includes:

enabling another UAV that does not perform target positioning in the UAV cluster to be close to the position of the target by using the multi-agent reinforcement learning method, and maintaining, by the UAV that completes target positioning, the target at a center of a sensing range of the UAV, as shown in FIG. 4A, to finally implement collaborative tracking of the UAV cluster, as shown in FIG. 4B.

Based on the foregoing, the embodiments of the present disclosure provide a multi-view collaborative tracking method for a fast moving target under a low luminance condition. In a low luminance scenario, feature extraction is performed on multi-source fused sensing data of a UAV cluster, a position of a target in a world coordinate system is determined, and coordinate information is shared through cluster communication, to collaboratively track a fast moving target.

According to the multi-view collaborative tracking method for a fast moving target under a low luminance condition, fusion feature extraction is performed on data outputted by a millimeter wave radar sensor, an RGB visual sensor, and an infrared visual sensor, after feature extraction is completed, the position of the target in the world coordinate system is determined by using a multi-source fusion sensing feature calculation network, then a UAV target tracking result is shared through cluster communication, and a trajectory is formulated and updated by using a multi-agent reinforcement learning algorithm, thereby improving target feature information extraction quality, reducing sensing and communication losses, and improving a target tracking effect in the low luminance scenario.

According to the multi-view collaborative tracking method for a fast moving target under a low luminance condition, multi-angle collaborative observation can be performed on a high-speed moving object in an environment of weak texture and low luminance, thereby improving tracking quality and efficiency of the UAV cluster.

Correspondingly, an embodiment of the present disclosure further provides a multi-view collaborative tracking apparatus for a fast moving target under a low luminance condition, including a multi-view tracking algorithm module for a fast moving target under a low luminance condition module and a UAV cluster collaborative tracking algorithm module.

The multi-view tracking algorithm module for a fast moving target under a low luminance condition is configured to:

perform multi-source environment sensing by using sensors that include a millimeter wave radar sensor, an RGB visual sensor, and an infrared visual sensor and are carried by a UAV;

normalize, in a time dimension and a space dimension by using a three-space-time heterogeneous alignment algorithm, multi-source sensing data received by different sensors;

input multi-source fused sensing data obtained through space-time normalization into a multi-source fusion sensing feature calculation network and calculate world coordinates of a tracked target under a current frame; and compare a calculation result with a calculation result of a previous frame, and determine changes of a position and a moving direction of the tracked target in a world coordinate system.

The UAV cluster collaborative tracking algorithm module is configured to:

share world coordinate information of the tracked target through cluster communication, and formulate and update a trajectory of a UAV cluster through multi-agent reinforcement learning, to ensure that the tracked target is at a center of a sensing range of the UAV, and implement collaborative tracking of the UAV cluster.

The apparatus of this embodiment can be configured to execute the technical solution of the method embodiment shown in FIG. 1, and an implementation principle and a technical effect are similar, and are not described herein.

An embodiment of the present disclosure further provides an electronic device. The electronic device may vary greatly due to different configurations or performance and may include one or more processors (central processing units, CPUs) or one or more memories. The memory stores at least one instruction, and the at least one instruction is loaded and executed by the processor to implement the steps of the multi-view collaborative tracking method for a fast moving target under a low luminance condition.

In an example embodiment, a computer-readable storage medium is further provided, for example, a memory including an instruction, where the instruction is executed by a processor in a terminal to complete the multi-view collaborative tracking method for a fast moving target under a low luminance condition. For example, the computer-readable storage medium may be a ROM, a random access memory (RAM), a CD-ROM, a magnetic tape, a floppy disk, an optical data storage device, or the like.

It should be noted that terms "including", "include", or any other variants thereof are intended to cover non-exclusive inclusion, such that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or terminal device including the elements.

It should be pointed out that "one embodiment", "embodiments", "exemplary embodiment", "some embodiments" and other indicating words mentioned in the specification can include specific features, structures or characteristics, but not necessarily every embodiment includes the specific features, structures or characteristics. In addition, when describing specific features, structures or characteristics in combination with embodiments, the realization of such features, structures or characteristics in combination with other embodiments (whether explicitly described or not) is within the knowledge of those skilled in the relevant art.

The present disclosure covers any substitution, modification, equivalent method and solution made within the spirit and scope of the present disclosure. For a better understanding of the present disclosure, the specific details of the following preferred embodiments of the present disclosure are explained hereinafter in detail, while the present disclosure can also be fully understood by those skilled in the art without the description of these details. In addition, in order to avoid unnecessary confusion of the essence of the present disclosure, well-known methods, processes, flowcharts, elements, and circuits are not described in detail.

Those of ordinary skill in the art can understand that all or some of the steps in the method of the above embodiment may be implemented by instructing related hardware by using a program. The program may be stored in a computer-readable storage medium. The storage medium may be a read-only memory (ROM)/random access memory (RAM), a disk, a compact disc, etc.

The above are merely preferred examples of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A multi-view collaborative tracking method for a fast moving target under a low luminance condition, wherein the method comprises a multi-view tracking algorithm for a fast moving target under a low luminance condition and an unmanned aerial vehicle (UAV) cluster collaborative tracking algorithm;

the multi-view tracking algorithm for a fast moving target under a low luminance condition comprises the following steps:

performing multi-source environment sensing by using sensors that comprise a millimeter wave radar sensor, a red green blue (RGB) visual sensor, and an infrared visual sensor and are carried by a UAV;

normalizing, in a time dimension and a space dimension by using a three-space-time heterogeneous alignment algorithm, multi-source sensing data received by different sensors;

inputting multi-source fused sensing data obtained through space-time normalization into a multi-source fusion sensing feature calculation network and calculating world coordinates of a tracked target under a current frame; and comparing a calculation result with a calculation result of a previous frame, and determining changes of a position and a moving direction of the tracked target in a world coordinate system; and the UAV cluster collaborative tracking algorithm comprises the following steps:

sharing world coordinate information of the tracked target through cluster communication, and formulating and updating a trajectory of a UAV cluster through multi-agent reinforcement learning, to ensure that the tracked target is at a center of a sensing range of the UAV, and implement collaborative tracking of the UAV cluster.

2. The multi-view collaborative tracking method for a fast moving target under a low luminance condition according to claim 1, wherein the three-space-time heterogeneous alignment algorithm specifically comprises:

first preprocessing the multi-source sensing data acquired by the sensors; for sensing data of the millimeter wave radar sensor, removing invalid data comprising a static target and an empty target; and for sensing data of the RGB visual sensor and the infrared visual sensor, performing image denoising, to highlight a feature of the target;

then performing space-time alignment on denoised sensing data of the RGB visual sensor and the infrared visual sensor, wherein because view directions of the RGB visual sensor and the infrared visual sensor are relatively fixed on a same UAV, alignment is performed by using a scale invariant feature transform (SIFT) operator in a machine learning method; and calibrating the sensing data of the millimeter wave radar sensor based on the sensing data of the RGB visual sensor; for time heterogeneity, performing radar-visual time calibration based on a sampling frequency of the sensing data of the millimeter wave radar sensor, and for space heterogeneity, establishing a unified coordinate system according to actual deployment positions of two sensors, and establishing a conversion relationship between a respective coordinate system and the world coordinate system; and finally completing space-time heterogeneous alignment on the three pieces of sensing data.

3. The multi-view collaborative tracking method for a fast moving target under a low luminance condition according to claim 2, wherein after data preprocessing is completed, scale normalization is performed on the multi-source sensing data by using the three-space-time heterogeneous alignment algorithm; and the sensing data of the infrared visual sensor and the sensing data of the millimeter wave radar sensor are respectively aligned based on a space scale and a time latitude of the sensing data of the RGB visual sensor;

for alignment of the sensing data of the infrared visual sensor and the RGB visual sensor, because the infrared visual sensor and the RGB visual sensor are fixed relative to a body of the UAV, and variations of views are relatively small, calibration is performed by using the SIFT operator, a space parameter of the sensing data of the RGB visual sensor is fixed, the sensing data of the infrared visual sensor in the same time latitude is inputted, and pixel-aligned sensing data of the infrared visual sensor is outputted; and in the time latitude, the two pieces of sensing data are aligned by using the same sampling frequency; and for alignment of the sensing data of the millimeter wave radar sensor and the RGB visual sensor, for time calibration of the two pieces of sensing data, the sampling frequency of the millimeter wave radar sensor is used as a time reference, a pulse frequency is sent for each sampling, and after receiving the pulse frequency, a central control determines a quantity of frames in sampling of the millimeter wave radar sensor as a sampling result, to implement time calibration; and for space calibration of the two pieces of sensing data, the coordinate system needs to be unified, a radar video is defined as resolving a feature matrix $[x, y, 1]^T$, radar physical coordinates of four pairs of targets are acquired and calibrated with video coordinates, and then a conversion relationship between a radar coordinate system and the world coordinate system is established, wherein a calculation formula of the conversion relationship is as follows:

$$x' = \left(\frac{x}{\Delta x}\right)\cos\theta + \left(\frac{y}{\Delta y}\right)\sin\theta + \alpha, \; y' = \left(\frac{y}{\Delta y}\right)\cos\theta + \left(\frac{x}{\Delta x}\right)\sin\theta + \beta$$

wherein (x, y) is radar detected target coordinates, (x', y') is converted world coordinates, $\Delta$ is a scaling relationship between related coordinate axes, $\alpha$ and $\beta$ represent translation amounts of corresponding coordinate axes, and $\theta$ represents a rotation angle of a coordinate system.

4. The multi-view collaborative tracking method for a fast moving target under a low luminance condition according to claim 2, wherein the multi-source fusion sensing feature calculation network is a convolutional neural network and comprises a feature extraction module, a feature fusion module, and a target position prediction module of each sensor; and the feature extraction module is configured to perform target feature extraction on the sensing data of each sensor, and send an extracted feature to the feature fusion module to obtain a multi-source fused sensing feature, and finally the target position prediction module is configured to calculate a position of the target in the current frame, and perform world coordinate system conversion according to a relative position of a sensor that is of the UAV and shoots the target, to obtain a position of the target in the current world coordinate system.

5. The multi-view collaborative tracking method for a fast moving target under a low luminance condition according to claim 4, wherein in the feature extraction module, a feature extraction network is built for the sensing data of the three sensors, feature extraction is performed on the sensing data of the RGB visual sensor and the sensing data of the infrared visual sensor by using a lightweight cross stage partial (CSP) Darknet 53 network, feature extraction is performed on the sensing data of the millimeter wave radar sensor by using a lightweight visual geometry group (VGG)-13 network, and the input sensing data of the millimeter wave radar sensor is converted into a radar feature that has a same size as the sensing data of the RGB visual sensor;

in the feature fusion module, features of the sensing data of the three sensors are further processed and spliced into a composite vector, wherein a calculation formula is:

$$F_{fusion} = \sigma(f_{radar} + f_{RGB} + f_{IR})$$

$$f_* = W_2 \cdot \tau(W_1 \cdot \tau(W_0(AvgPool(F_*))))$$

wherein $\sigma$ and $\tau$ in the formula represent a Sigmoid activation function and a ReLU activation function, $W_0$, $W_1$, and $W_2$ are network weight parameters, $F_*$ is a feature map, $f_{radar}$ is an extracted radar feature, $f_{RGB}$ is an extracted RGB visual feature, $f_{IR}$ is an extracted infrared visual feature, $F_{fusion}$ is a fused feature, and $f_*$ is a spliced feature map; and the spliced feature map is sent to the target position prediction module and the position of the target is determined; and then the position of the current target in the world coordinate system is calculated according to a conversion relationship between a coordinate system of the RGB visual sensor and the world coordinate system.

6. The multi-view collaborative tracking method for a fast moving target under a low luminance condition according to claim 1, wherein the UAV cluster collaborative tracking algorithm comprises:

after completing target positioning, sharing, by any UAV in the UAV cluster, the world coordinates of the target and position information of the UAV by using a cluster communication function of the UAV; and then enabling another UAV in the UAV cluster to be close to the coordinates of the tracked target by using a multi-agent reinforcement learning method, to implement collaborative tracking of the UAV cluster.

7. The multi-view collaborative tracking method for a fast moving target under a low luminance condition according to claim 6, wherein the enabling another UAV in the UAV cluster to be close to the coordinates of the tracked target by using a multi-agent reinforcement learning method specifically comprises:

enabling another UAV that does not perform target positioning in the UAV cluster to be close to the position of the target by using the multi-agent reinforcement learning method, and maintaining, by the UAV that completes target positioning, the target at a center of a sensing range of the UAV, to finally implement collaborative tracking of the UAV cluster.

8. A multi-view collaborative tracking apparatus for a fast moving target under a low luminance condition, comprising a multi-view tracking algorithm module for a fast moving target under a low luminance condition and a UAV cluster collaborative tracking algorithm module;

the multi-view tracking algorithm module for a fast moving target under a low luminance condition is configured to:

perform multi-source environment sensing by using sensors that comprise a millimeter wave radar sensor, a red green blue (RGB) visual sensor, and an infrared visual sensor and are carried by a UAV;

normalize, in a time dimension and a space dimension by using a three-space-time heterogeneous alignment algorithm, multi-source sensing data received by different sensors;

input multi-source fused sensing data obtained through space-time normalization into a multi-source fusion sensing feature calculation network and calculate world coordinates of a tracked target under a current frame; and compare a calculation result with a calculation result of a previous frame, and determine changes of a position and a moving direction of the tracked target in a world coordinate system; and the UAV cluster collaborative tracking algorithm module is configured to:

share world coordinate information of the tracked target through cluster communication, and formulate and update a trajectory of a UAV cluster through multi-agent reinforcement learning, to ensure that the tracked target is at a center of a sensing range of the UAV, and implement collaborative tracking of the UAV cluster.

9. An electronic device, comprising a processor and a memory, wherein the memory stores at least one instruction, and the at least one instruction is loaded and executed by the processor to implement the multi-view collaborative tracking method for a fast moving target under a low luminance condition according to claim 1.

10. An electronic device, comprising a processor and a memory, wherein the memory stores at least one instruction, and the at least one instruction is loaded and executed by the processor to implement the multi-view collaborative tracking method for a fast moving target under a low luminance condition according to claim 2.

11. An electronic device, comprising a processor and a memory, wherein the memory stores at least one instruction, and the at least one instruction is loaded and executed by the processor to implement the multi-view collaborative tracking method for a fast moving target under a low luminance condition according to claim 3.

12. An electronic device, comprising a processor and a memory, wherein the memory stores at least one instruction, and the at least one instruction is loaded and executed by the processor to implement the multi-view collaborative tracking method for a fast moving target under a low luminance condition according to claim 4.

13. An electronic device, comprising a processor and a memory, wherein the memory stores at least one instruction, and the at least one instruction is loaded and executed by the processor to implement the multi-view collaborative tracking method for a fast moving target under a low luminance condition according to claim 5.

14. An electronic device, comprising a processor and a memory, wherein the memory stores at least one instruction, and the at least one instruction is loaded and executed by the processor to implement the multi-view collaborative tracking method for a fast moving target under a low luminance condition according to claim 6.

15. An electronic device, comprising a processor and a memory, wherein the memory stores at least one instruction, and the at least one instruction is loaded and executed by the processor to implement the multi-view collaborative tracking method for a fast moving target under a low luminance condition according to claim 7.

16. A non-transitory computer-readable storage medium, storing at least one instruction, wherein the at least one instruction is loaded and executed by a processor to implement the multi-view collaborative tracking method for a fast moving target under a low luminance condition according to claim 1.

17. A non-transitory computer-readable storage medium, storing at least one instruction, wherein the at least instruction is loaded and executed by a processor to implement the multi-view collaborative tracking method for a fast moving target under a low luminance condition according to claim 2.

18. A non-transitory computer-readable storage medium, storing at least one instruction, wherein the at least instruction is loaded and executed by a processor to implement the multi-view collaborative tracking method for a fast moving target under a low luminance condition according to claim 3.

19. A non-transitory computer-readable storage medium, storing at least one instruction, wherein the at least instruction is loaded and executed by a processor to implement the multi-view collaborative tracking method for a fast moving target under a low luminance condition according to claim 4.

20. A non-transitory computer-readable storage medium, storing at least one instruction, wherein the at least instruction is loaded and executed by a processor to implement the multi-view collaborative tracking method for a fast moving target under a low luminance condition according to claim 5.

* * * * *